United States Patent
Raza

(10) Patent No.: US 11,913,600 B2
(45) Date of Patent: Feb. 27, 2024

(54) SHAPED BOTTLE WITH ATTACHMENT FEATURE

(71) Applicant: Khurram Raza, Garland, TX (US)

(72) Inventor: Khurram Raza, Garland, TX (US)

(*) Notice: Subject to any disclaimer, the term of this patent is extended or adjusted under 35 U.S.C. 154(b) by 497 days.

(21) Appl. No.: 17/337,807

(22) Filed: Jun. 3, 2021

(65) Prior Publication Data

US 2022/0136646 A1     May 5, 2022

Related U.S. Application Data

(60) Provisional application No. 63/107,477, filed on Oct. 30, 2020.

(51) Int. Cl.
| | | |
|---|---|---|
| *F16M 13/02* | (2006.01) | |
| *B65D 23/10* | (2006.01) | |
| *H01F 1/057* | (2006.01) | |
| *H01F 7/02* | (2006.01) | |
| *B65D 1/02* | (2006.01) | |

(52) U.S. Cl.
CPC ......... *F16M 13/022* (2013.01); *B65D 1/0223* (2013.01); *B65D 23/10* (2013.01); *H01F 1/057* (2013.01); *H01F 7/0252* (2013.01)

(58) Field of Classification Search
CPC .............. F16M 13/022; B65D 25/2885; B65D 1/0223; B65D 25/38; B65D 2313/04; H01F 1/11; H01F 7/0252
USPC .......... 248/206.5, 309.4; 220/771, 369, 371; 222/456.1, 482; 215/382, 384, 365
See application file for complete search history.

(56) References Cited

U.S. PATENT DOCUMENTS

| | | | | |
|---|---|---|---|---|
| 4,881,650 A * | 11/1989 | Bartz | ............... | F16N 31/004 |
| | | | | 215/383 |
| 4,957,209 A * | 9/1990 | Helin | ............... | B65D 1/0223 |
| | | | | 215/44 |
| 5,199,588 A * | 4/1993 | Hayashi | ............... | B65D 1/0223 |
| | | | | 220/666 |
| 5,299,710 A * | 4/1994 | Welsch | ............... | B65D 1/18 |
| | | | | 220/675 |
| 5,318,787 A * | 6/1994 | Brauner | ............... | B65D 21/0238 |
| | | | | 215/390 |
| 5,485,942 A * | 1/1996 | Foster | ............... | B05B 15/30 |
| | | | | 220/756 |
| 5,833,115 A * | 11/1998 | Eiten | ............... | B65D 1/0276 |
| | | | | 215/382 |
| 5,954,216 A * | 9/1999 | Meisner | ............... | B65D 1/0223 |
| | | | | 215/398 |
| 6,068,161 A * | 5/2000 | Soehnlen | ............... | B65D 25/2885 |
| | | | | 220/675 |
| 6,237,792 B1 * | 5/2001 | Skolnicki | ............... | B65D 25/2897 |
| | | | | 215/396 |

* cited by examiner

*Primary Examiner* — Todd M Epps
(74) *Attorney, Agent, or Firm* — Brennan, Manna & Diamond, LLC

(57) ABSTRACT

This present invention relates to a bottle for storing a fluid. The bottle has a geometric shape and features two fastening elements for attaching the bottle to a surface. A first fastening element is present on a side surface and a second fastening element is present on the bottom surface of the bottle. The bottle also features a circular cap with an internal storage to store medication, vitamins, workout supplements, and other similar items. A triangular lid dispenses fluid from a reservoir for a user.

20 Claims, 4 Drawing Sheets

SHAPED BOTTLE WITH ATTACHMENT FEATURE

CROSS-REFERENCE TO RELATED APPLICATION

The present application claims priority to, and the benefit of, U.S. Provisional Application No. 63/107,477, which was filed on Oct. 30, 2020 and is incorporated herein by reference in its entirety.

FIELD OF THE INVENTION

The present invention relates generally to the field of bottles or containers which are used for holding items for use by an individual. More specifically, the present invention relates to an improved water bottle or beverage container with a gripping handle and one or more attachment features, such as a magnetic plate, or elements or other mechanical fasteners for securing the bottle or container to a metallic surface. The water bottle or container includes a threaded cap with a compartment used to store vitamins, medication, supplements and other similar items for ready access by the user. The uniquely-designed water bottle allows a user to secure the bottle on gym equipment, a desk and multiple other locations to prevent the bottle from falling over and spilling. In addition, the bottle or container is shaped and configured to provide a better engagement surface and to reduce the profile so as to minimize contact with the bottle or container when it is attached or held in position. Accordingly, the present disclosure makes specific reference thereto. Nonetheless, it is to be appreciated that aspects of the present invention are also equally applicable to other like applications, devices and methods of manufacture.

BACKGROUND OF THE INVENTION

By way of background, bottles and containers are used by people while exercising, climbing, cycling or more sedentary activities such as working, relaxing or reading, to store water or other drinks to hydrate or otherwise refresh themselves. While exercising in gyms or while at work, people may lack space to keep or hold their water bottles or other containers. Generally, people place their water bottles or containers on the floor or table so that they can easily access the bottle when required. However, the water bottles or drink containers when placed on floor or table, are often at risk of being knocked over, inadvertently kicked or pushed away and spilled. This puts an additional burden on the users as they are then required to clean the spilled water, as well as to potentially locate the fallen bottle or container. Also, when bottles are placed on the floor or table surface, the bottle can become dirty and unsanitary since the floor or table surface is likely not clean. The dirty and unsanitary bottle or container can then cause the spread of germs, viruses, bacteria and other harmful pathogens, and may further cause transmission of infectious diseases amongst people. In addition, people may forget about the bottle or container if it is not in plain sight.

Additionally, while away from home, such as the gym or office, people may desire to carry their medications, nutritional supplements, workout supplements and other similar items which are necessary for their health. However, people may not have anywhere to store such items. Some people may carry a separate bag or pouch for storing the medications, nutritional needs or supplements, to readily access these items when required. However, it may be difficult for the individuals to carry multiple items such as water bottles, a separate pouch for storing medications/supplements, and others containers or bags to gyms, offices, etc. Also, some people may forget to take their medications or workout supplements when going to gyms or offices, and may later suffer the consequences of not taking the medications in a timely fashion.

Therefore, there exists a long felt need in the art for a device which allows the users to easily carry their bottles to gyms, offices and other similar places. There is also a long felt need in the art for a device which allows the bottles to be easily and securely placed while exercising, working or engaging in other activities or generally sedentary tasks. Additionally, there is a long felt need in the art for an improved bottle or container which eliminates the need to place the bottles on the floor, a table or other surfaces which are not conveniently located to the user such as in lockers or the like, and prevents the bottles or containers from being dirty or unsanitary. Moreover, there is a long felt need in the art for an improved bottle or container which prevents the spread of germs, viruses, and other harmful pathogens, and prevents spread of infectious diseases. Further, there is a long felt need in the art for an improved bottle which prevents the bottles or containers from being knocked over, kicked, moved and spilled, and prevents the user from having to clean up the mess created by the spilled water or other contents of the bottle or container. Furthermore, there is a long felt need in the art for an improved bottle or container which eliminates the need to carry additional pouches for keeping medications or workout supplements. Finally, there is a long felt need in the art for an improved bottle or container which ensures the user stays hydrated and holds any desired supplements, medicines or other nutritional materials with ease while away from home.

The subject matter disclosed and claimed herein, in one embodiment thereof, comprises a geometrically-shaped bottle or container designed to store fluid and be removably-positioned on a surface. The bottle or container has three walls joined to each other, thereby forming a geometric configuration such as a triangular shape, with a bottom surface and a top surface. One of the walls forms a generally planar side wall, and is substantially rectangular or square, with a shaped magnetic plate or other fastener. The bottom surface has a shaped fastening plate, and the top surface has a similarly-shaped lid for dispensing fluid, and a circular cap having an internal storage compartment for storing medication, vitamins, nutritional products, workout supplements and other similar items. The bottle or container magnetically sticks or otherwise attaches to the surface, using one of the magnetic plates or other fasteners or, alternatively, the shaped plate allows secure storage of the bottle or container. The bottle may be hung from or positioned on a surface using one of the fastening plates or, alternatively, may be fastened or secured to a longitudinal surface using the fastening plate.

In this manner, the novel bottle or container of the present invention accomplishes all of the forgoing objectives, and provides a relatively safe, easy and convenient solution to secure bottles while exercising, participating in activities or working at home. The bottle or container of the present invention is also user-friendly, as it prevents the bottle from becoming dirty or unsanitary, and therefore prevents the spread of infectious diseases. Additionally, the small compartment or storage area inside the cap of the bottle or container allows the users to store vitamins, medications, supplements, nutritional elements or other similar items, thereby making these items readily accessible to the users.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a geometrically-shaped magnetic bottle, designed to store fluid which attaches or connects to a metal surface or a surface having corresponding attachment elements. The bottle or container has three walls joined to each other to form a substantially triangular shape. A bottom surface and a top surface, with one of the three walls, forms a side wall and is substantially rectangular with an attachment feature on the bottom surface. The top surface has a triangular lid for dispensing a fluid and a circular cap covering an internal storage compartment for keeping medication, vitamins, workout supplements, nutritional aids and other similar items. The magnetic bottle or container adheres or connects to the surface using one of the fastening items, or alternatively the triangular plate allows a secure storage of the bottle or container when placed in an upright position. The bottle may be hung or supported from a surface using one of the fastening features, or the triangular surface with a similar or different fastening feature may be used to hold the bottle or container when positioned in a vertical configuration.

In a further embodiment of the present invention, a novel bottle with a fastening attachment feature is disclosed and comprises a side surface with a first fastening feature either permanently or removably attached to the side surface. A bottom surface has a second fastening feature which is either permanently or removably attached to the bottom surface, and which may be similar to or different from the first fastening feature. Two opposite surfaces form a cut-out grip with a silicon lining to assist in holding the bottle or container, and a top surface with a circular cap with internal storage to hold medications, vitamins, workout supplements, nutritional aids and other items, with a triangular lid for dispensing fluid. The bottle or container is removably attached to a surface using one of the first fastening features or the second fastening feature to provide secure and convenient storage, thereby reducing the risk of the bottle being knocked over and spilled easily if kept on the floor.

The bottle or container of the present invention is not required to be kept on a floor as the bottle or container can be attached or otherwise connected to any longitudinal, vertical or other surface which can accept the first and or second fastening member. Where mating elements of the fastening features are required, a first mating element is disposed on the bottle or container wall or base, and the second mating element is positioned on an area where the bottle or container is to be placed for storage or temporary holding. The first and second fastening features of the bottle or container allow users to secure the bottle on gym equipment, a desk, and multiple other locations for easy accessibility, and also prevention of the bottle from falling over and spilling. The fastening features secure the bottle to a desired surface for stable and secure storage.

The circular cap and the triangular lid can be opened with a single hand, which is a valuable feature for busy or physically-active consumers because they can more easily stay hydrated during activities such as working out in a gym. Further, eliminating the need to keep the bottle or container always on a floor is a valuable feature for people with physical problems, or who face difficulty bending and picking things from the floor. The design of the bottle and position of the fastening elements allow secure placement of the bottle on any suitable surface. The bottle or container ensures that a user stays hydrated and can take any desired supplements with ease while away from home and in the midst of physical activities. The triangular shape of the container is also advantageous as it allows movement of the sides of the container, as opposed to a rounded container, where a user may bump into and knock over the shape. The wider portion of the container is positioned away from movement, and the narrower portion is closer to the first area of contact.

The advantage of the bottle of the present invention is that it can be secured at any position or height on a suitable surface, and need not always be placed on the floor or on a horizontal surface. When attached to a piece of gym equipment, the bottle or container can also be used as an indication that the equipment is being used by the owner of the bottle. The bottle or container remains secure, and should not be knocked over by people while walking by. Attaching the bottle helps to prevent the spread of germs and pathogens as well. The bottle can be secured to a metal area under an office desk by a user for easy accessibility.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE INVENTION

Figure 1:
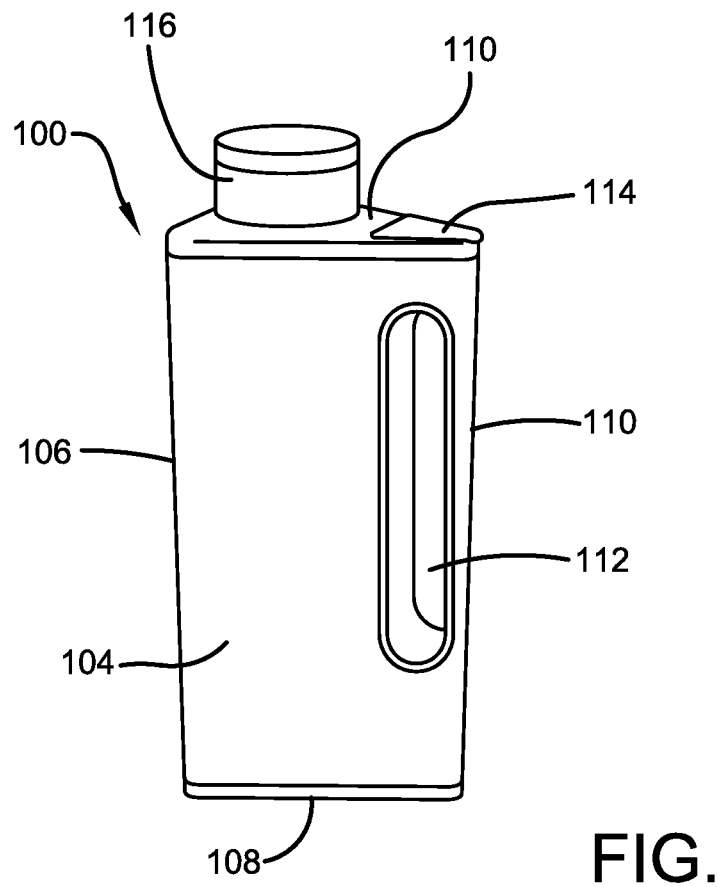
FIG. 1 illustrates a perspective view of one potential embodiment of the shaped bottle or container of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a device which allows the users to easily carry their bottles to gyms, offices and other similar places. There is also a long felt need in the art for a device which allows the bottles or containers to be easily placed while exercising or at work. Additionally, there is a long felt need in the art for an improved bottle or container which eliminates the need to place the bottles or containers on a floor or table, and prevents the bottles from becoming dirty or unsanitary. Moreover, there is a long felt need in the art for an improved bottle or container which prevents the spread of germs, viruses, and other harmful pathogens, thereby preventing the spread of infectious diseases. Further, there is a long felt need in the art for an improved bottle or container which is not easily knocked or kicked over and spilled, thereby preventing the user from having to clean up the mess created by spilled water or other contents of the container. Furthermore, there is a long felt need in the art for an improved bottle or container which eliminates the need to carry additional pouches, containers or bags for keeping medications or workout supplements accessible to the user. Finally, there is a long felt need in the art for an improved bottle or container which ensures the user stays hydrated and takes any desired supplements with ease while away from home.

The present invention, in one exemplary embodiment, is a novel geometrically-shaped, such as a triangular-shaped bottle or container designed to store fluid and adhere to a surface and comprises three walls joined to each other forming a triangular shape. The bottle or container has a bottom surface and a top surface. One of the three walls forms a side wall and is substantially planar and in a rectangular shape, with a first fastening member such as a rectangular magnetic plate. The bottom surface has a second fastening member such as a triangular magnetic plate. The top surface has a triangular lid for dispensing fluid, and a circular cap covering an internal storage compartment for storing medication, vitamins, workout supplements and other similar items. The bottle sticks, adheres or is otherwise secured to a surface using one of the first and second fastening members, allowing a secure storage of the bottle or container. The bottle or container may be supported from a surface using at least one of the first and second fastening members. The side surface fastening member holds the bottle or container in a second orientation, and the bottom surface fastening member holds the bottle or container in a first orientation, different from the second orientation. As used herein, fastening members may include magnetic plates or elements, hook and loop fasteners, snaps having male and female connectors, clasps, a removable adhesive pad to temporarily secure the bottle or container to a surface, or combinations thereof.

Referring initially to the drawings, FIG. 1 illustrates a perspective view of one potential embodiment of the shaped bottle or container 100 of the present invention in accordance with the disclosed architecture. The bottle 100 is a geometrically-shaped, such as a triangular shaped bottle or container, capable of storing water or any other fluid as well as pourable dry goods and other consumable products, and is designed to be stored or attached to supporting surface. The bottle has a plurality of fastening members on one or more surfaces to securely adhere and attach to a surface, to prevent the bottle 100 from falling over and spilling, and securing the bottle or container in a convenient location for use.

The bottle 100 in one embodiment has three surfaces forming the triangular shape. A first surface 104, a second surface 106 and a third surface (not shown in FIG. 1) opposite to the first surface 104, such that the second surface 106 is substantially planar and rectangular in shape and is connected to the first surface 104 and the third surface along the longitudinal edges of the surfaces. The first surface 104 and the third surface are joined to each other, thereby forming a cornered edge 102. The first surface 104, the second surface 106 and the third surface form the walls of the bottle 100, which also has a bottom surface 108 and a top surface 110. The top surface 110 and the bottom surface 108 are substantially similar in shape and size and are roughly triangular in shape. The dimensions of the first surface 106 and the third surface are similar in shape and size. The side surface fastening member holds the bottle or container in a second orientation, and the bottom surface fastening member holds the bottle or container in a first orientation, different form the first orientation.

The bottle 100 may be placed on a surface using the bottom surface 108. The first surface 104 and the third surface have a cut-out grip 112 to comfortably hold the bottle 100. The cut-out grip 112 allows a user to easily hold and carry the bottle or container 100. The top surface 110 has a triangular lid 114 which may be used to dispense water or other beverages stored in the bottle or container 100. The lid 114 or first opening is connected to the fluid reservoir containing the water or other fluid to be dispensed. A circular cap 116 covers a small internal storage compartment. The compartment can be used for storing medication, vitamins, workout supplements, nutritional aids and other similar items.

One or more surfaces, preferably the second surface 106 and the bottom surface 108, include sturdy and durable fastening members such as magnetic plates for securing the bottle 100 to a suitable surface. The triangular shape of the bottle 100 allows a correct orientation and strong grip of the magnetic plates to a metal surface. The bottle or container 100 of the present invention is stainproof, odor and taste resistant, lightweight and BPA free. The bottle 100 may be made up of a material such as aluminum, stainless steel or the like. The grip 112 may also have a silicon lining.

The type of magnetic material used herein may be either a permanent or a soft magnet. The permanent magnet is divided into two categories. The first category is metal alloy magnets, including neodymium iron boron (Nd—Fe—B) magnets, samarium cobalt magnets and aluminum nickel cobalt magnets. The second major categories are ferrite permanent magnets. Nd—Fe—B magnets are generally the strongest type of magnets, and can be manufactured in any number of shapes, and are the preferred magnet for use in the present invention.

Figure 2:
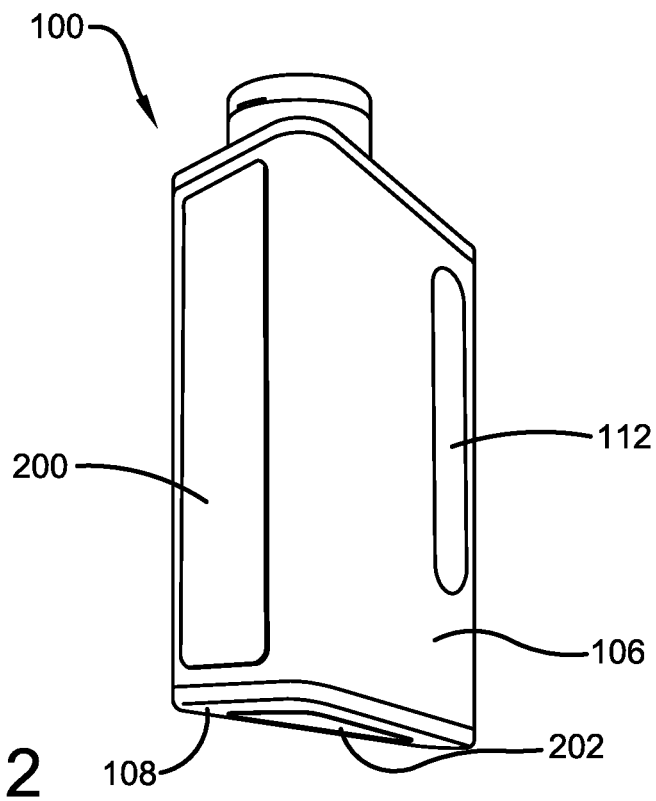
FIG. 2 illustrates a perspective view of one potential embodiment of the shaped bottle or container of the present invention having fastening features being used to adhere or secure the shaped bottle or container to one or more surfaces in accordance with the disclosed architecture.

FIG. 2 illustrates a perspective view of one potential embodiment of the shaped bottle or container 100 of the present invention having fastening features being used to adhere or secure the shaped bottle or container 100 to one or more surfaces in accordance with the disclosed architecture. More specifically, the bottle or container 100 can stick, adhere or be attached to any suitable surface such as gym equipment, which makes the bottle or container 100 easy to access and allows it to be placed off the floor in a more sanitary, elevated position. A rectangular industrial strength magnet 200, having a size of up to eighty percent of the second surface 106, is permanently attached to the second surface 106. The rectangular industrial strength magnet 200 is used to secure the bottle or container 100 to a metallic surface, which eliminates the need to place the bottle 100 on a floor.

The bottle or container 100 can be securely placed on a floor using a base fastening member 202 which is permanently or removably attached to the bottom surface 108. The base fastening member 202 provides a secure grip on a floor or other horizontal surface and prevents the bottle or container 100 from being knocked or kicked over, or falling over and spilling. The rectangular industrial-strength magnet 200 and the base industrial strength magnet 202 are used to secure the bottle 100 on a piece of gym equipment, thereby allowing a user to access the bottle or container 100 easily, and preventing the bottle or container 100 from becoming dirty, unsanitary and spilling.

Based on the situation, the bottle or container 100 can be easily attached to a desired surface using one or both of the fastening members 200, 202 for stable and secure storage. The bottle or container 100 is especially useful for those using the gym or other personal training equipment, and may have a capacity in the range of 17 oz. to 40 oz. The easy accessibility and secure placement of the bottle or container 100, using one or both of the fastening members 200, 202, allows the users to save energy and prevent the bottle or container from becoming dirty and encountering pathogens from laying on the gym floor or other high-traffic areas. The bottle or container 100 is also useful for people who face difficulty in bending over thus finding it difficult to pick up a bottle from floor.

When the magnetic bottle or container 100 is positioned on a surface using one or more of the fastening members 200 and 202, the bottle or container can be easily removed from the surface and accessed by holding the cut-out grip 112. Both the magnets 200, 202 can be one or more of a polyester magnet, neodymium or N45. The magnetic plates 200, 202 are durable and are permanently attached to the surfaces. Other fastening members may be used such as hook and loop fasteners, or adhesive or mechanical fasteners such as clasps or snaps.

Figure 3:
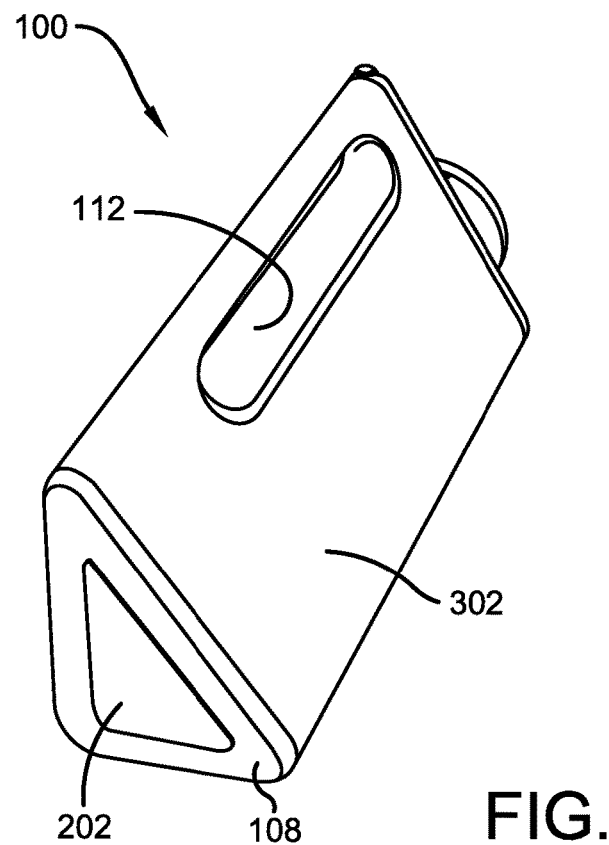
FIG. 3 illustrates a bottom perspective view of one potential embodiment of the shaped bottle or container of the present invention in accordance with the disclosed architecture.

FIG. 3 illustrates a bottom perspective view of one potential embodiment of the shaped bottle or container 100 of the present invention in accordance with the disclosed architecture. In one embodiment, the base industrial strength magnet 202 is triangular in shape, and is up to eighty percent of the size of the bottom surface 108, and is permanently attached to the bottom surface 108. The base magnet 202 is used to place the magnetic bottle 100 on a metal surface or floor and prevents the bottle 100 from being knocked or kicked over easily. As shown and stated earlier, the cut-out grip 112 is present in the third surface 302 as well for holding the bottle or container 100.

Figure 4:
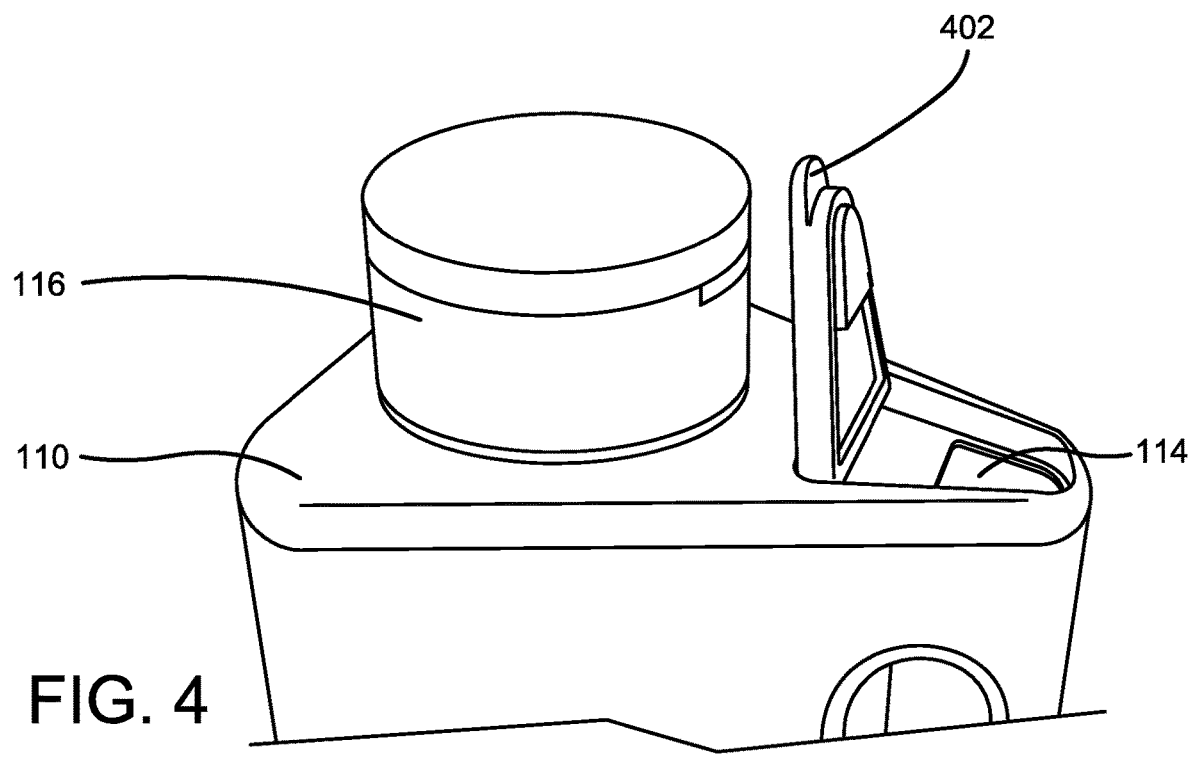
FIG. 4 illustrates a partial perspective view of the top of one potential embodiment of the shaped bottle or container of the present invention in accordance with the disclosed architecture, wherein the top portion comprises a generally triangular lid in an opened condition and a circular cap in a closed condition.

FIG. 4 illustrates a partial perspective view of the top of one potential embodiment of the shaped bottle or container 100 of the present invention in accordance with the disclosed architecture, wherein the top portion comprises a generally triangular lid in an open condition and a circular cap in a closed condition. More specifically, the top surface 110 of the bottle or container 100 has a triangular lid 116 which is opened to dispense water, flowable dry components, consumable products or fluid through the opening 402. The circular cap 116 is bigger in size than the triangular lid 116 and used to store vitamins, medication or supplements in an internal storage compartment. The circular cap 116 may also be removed to drink the water or fluid stored in the bottle or container 100. The bottle 100 ensures that a user can stay hydrated and take any desired supplements, medicines or other nutritional aids with ease while away from home. The bottle or container 100 can be carried easily during travel and allows a user to stay hydrated and take medication at regular intervals.

Figure 5:
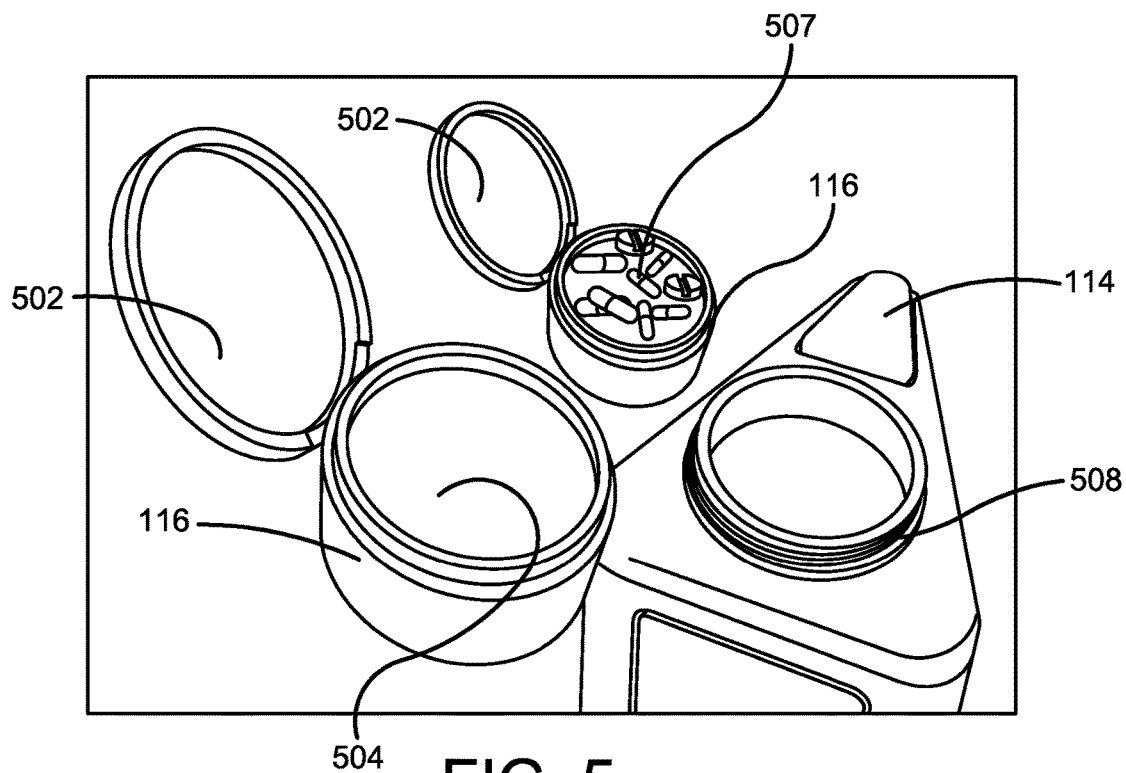
FIG. 5 illustrates a partial perspective view of the top of one potential embodiment of the shaped bottle or container of the present invention in accordance with the disclosed architecture, wherein the top portion comprises a generally triangular lid in a closed condition and two different circular caps in an opened position.

FIG. 5 illustrates a partial perspective view of the top of one potential embodiment of the shaped bottle or container 100 of the present invention in accordance with the disclosed architecture, wherein the top portion comprises a generally triangular lid in a closed condition and two different circular caps in an open position. As shown, the circular cap 116 is a threaded cap secured to the container by threads 508. The circular cap 116 has a lid 502 to secure the items stored in the internal storage compartment 504 beneath the cap. The internal storage compartment 504 may be used to store medication 506, vitamins, workout supplements and other similar items. The circular cap 116, when removed from the threads 508, may be used to drink water or other flowable powder or materials stored in the bottle 100. The triangular lid 114 may be used to drink water or fluid in small amounts, such as in between gym exercises.

Figure 6:
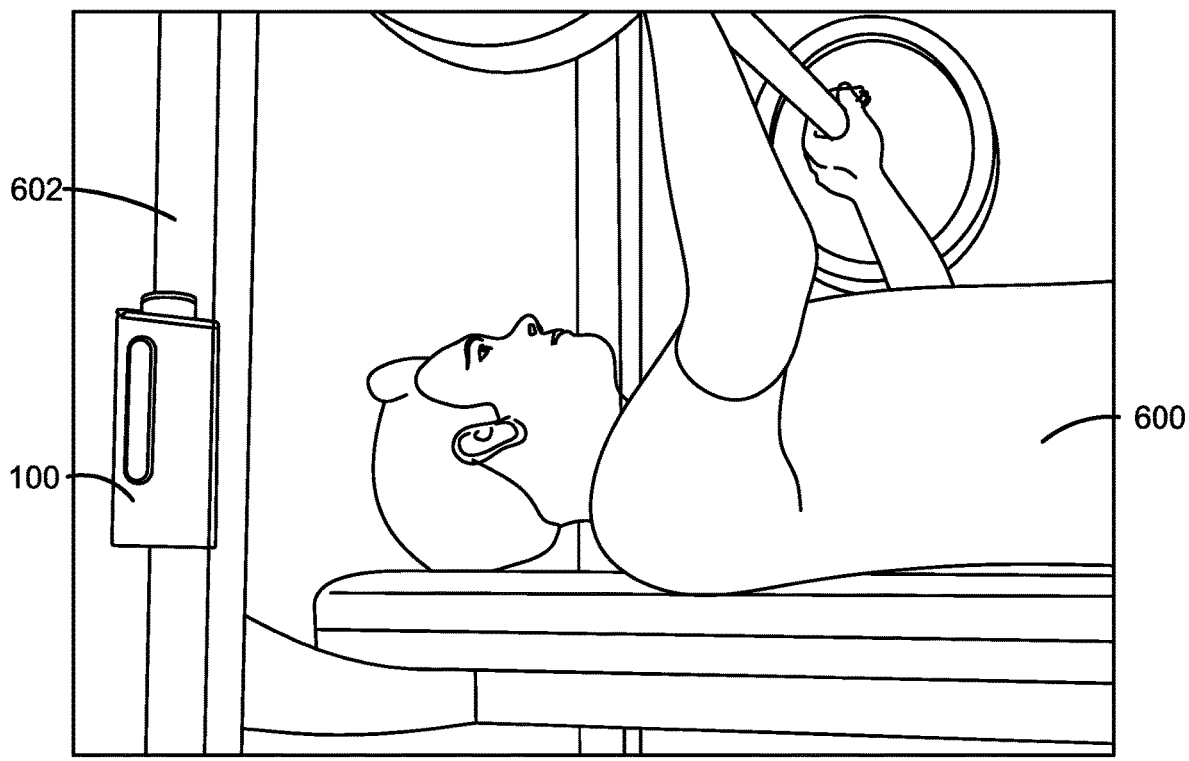
FIG. 6 illustrates a perspective view of one potential embodiment of the shaped bottle or container of the present invention in accordance with the disclosed architecture, wherein the shaped bottle or container is removably attached to the side of a weight bench.

FIG. 6 illustrates a perspective view of one potential embodiment of the shaped bottle or container 100 of the present invention in accordance with the disclosed architecture, wherein the shaped bottle or container 100 is removably attached to the side of a weight bench. More specifically, the bottle or container 100 sticks, adheres or secures to a piece of gym equipment 602 using the magnet plate 200 or other fastening members attached to the second surface to keep the bottle 100 handy and readily accessible for the user 600, and allows the user 600 to save energy. The elevated storage also avoids having to keep the bottle 100 on the ground or the gym floor. Using the magnetic power of the magnet on the second surface, the bottle 100 sticks or adheres to the gym equipment 602 securely, yet remains removable therefrom. The bottle or container 100 may hold up to 40 oz. fluid capacity, can be easily secured and attached to a piece of gym equipment or other desired surfaces. The bottle or container 100 may be attached to any standard gym equipment or other surfaces, and eliminates the need for a separate device or storage compartment to be carried by the user for medication, supplements and other similar items.

In an example scenario, the user 600 is training for a bodybuilding championship and would like to stay properly hydrated by drinking water at regular intervals, and also have easy access to his or her supplements. The user 600 having easy accessibility of the bottle 100 on the gym equipment he or she is using ensures having the fluid and supplements readily available and saves energy by not having to look for the lost bottle 100, thereby allowing the user to focus on training and reaching his or her goal.

Figure 7A:
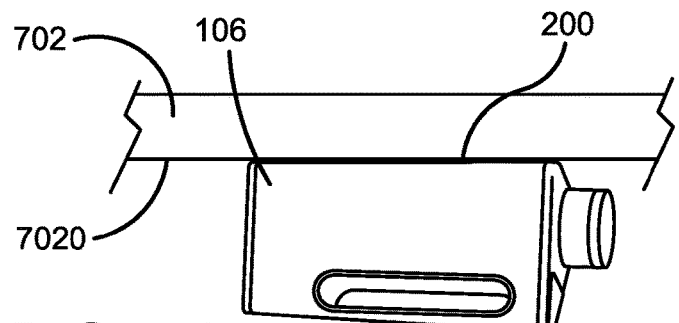
FIG. 7A illustrates a perspective view of one potential embodiment of the shaped bottle or container of the present invention in accordance with the disclosed architecture, wherein the shaped bottle or container is removably suspended from the underside of a metal structure.

FIG. 7A illustrates a perspective view of one potential embodiment of the shaped bottle or container 100 of the present invention in accordance with the disclosed architecture, wherein the shaped bottle or container 100 is removably suspended from the underside of a metal structure. More specifically, the bottle 100 may be secured and attached in any orientation using one or both magnetic plates or fastening members. In the present embodiment, the bottle 100 is supported or secured using the rectangular magnetic plate 200 attached to the second surface 106, which sticks or adheres to a surface 7020. The plate or fastening member 200 can hold a bottle 100 having a capacity of up to 40 oz.

Figure 7B:
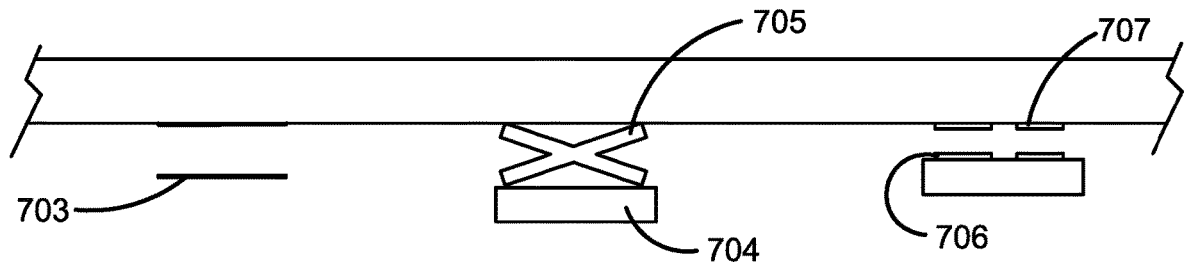
FIG. 7B illustrates a perspective view of one potential embodiment of the shaped bottle or container of the present invention in accordance with the disclosed architecture, wherein the shaped bottle or container is removably suspended from the underside of a structure using alternative fastening arrangements.

FIG. 7B illustrates a perspective view of one potential embodiment of the shaped bottle or container 100 of the present invention in accordance with the disclosed architecture, wherein the shaped bottle or container 100 is removably suspended from the underside of a structure using alternative fastening arrangements. More specifically, the alternative fastening arrangements may include, but are not limited to, a hook and loop system 703, a removable adhesive 705 coated or provided on a pad 704 or a mechanical fastening system of snaps having male and female or mating elements 706 and 707.

Figure 8:
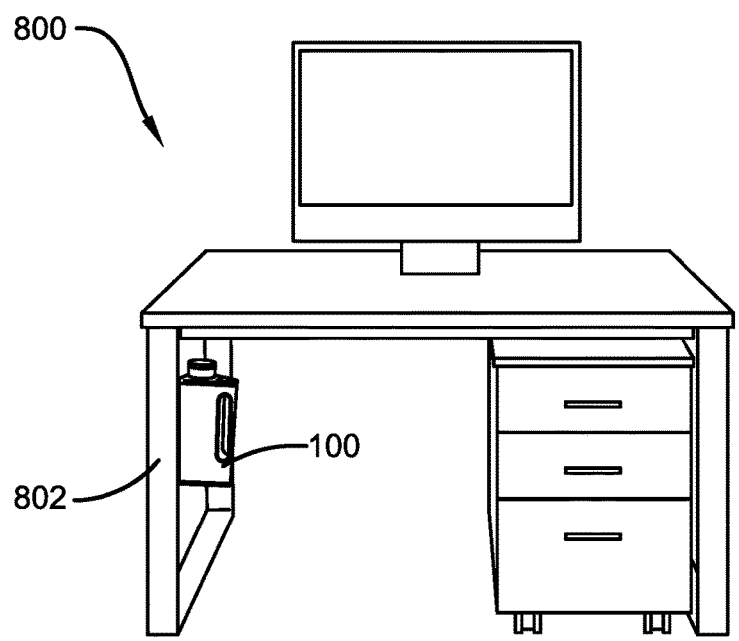
FIG. 8 illustrates a perspective view of one potential embodiment of the shaped bottle or container of the present invention in accordance with the disclosed architecture, wherein the shaped bottle or container is removably attached to the side of a desk.

FIG. 8 illustrates a perspective view of one potential embodiment of the shaped bottle or container 100 of the present invention in accordance with the disclosed architecture, wherein the shaped bottle or container 100 is removably attached to the side of a desk. More specifically, as the space on the office table or desk is limited, and it is also difficult for a user to bend over every time to pick up water bottle or container placed on the floor. The bottle or container 100 is advantageous inasmuch as it sticks or adheres securely to one of the poles or legs 802 of the desk for providing easy accessibility of the bottle or container 100 to the user. The user may also access medication by simply opening the circular cap, without the need to remove the bottle 100.

It should be noted that the magnetic plates or other fastening members 200, 202 of the bottle 100 can be attached to any suitable surface. Although, in a preferred embodiment, the magnetic plate 200 is rectangular in shape, and the magnet 202 is triangular in shape, however, the magnetic plates 200, 202 may be formed in any geometric shape. The bottle 100 holds more liquid and has a more stable base when the bottom surface 108 is placed on a generally horizontal surface.

In one embodiment, a carrying strap may be present to carry the bottle 100 and is made up of a polymer. The carrying strap is comprised of any suitable material such as other TPEs, polypropylene or polyethylene. In one embodiment, the bottle 100 retains the heat or cold temperature of the fluid and offers temperature insulation.

The bottle 100 may have a logo, indicia or trademark along with customizable colors and fonts, embroidery and prints and/or other images on one or more surfaces 104, 106, 302. The bottle 100 may come in different sizes, styles, colors, and designs to fit user requirements. The bottle 100 of the present invention has a low cost of manufacture with regard to both materials and labor, and which accordingly is then susceptible to low prices of sale to the consuming public, thereby making it economically available to the buying public.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "bottle", "container" and "bottle with magnetic plates or fastening members", are interchangeable and refer to the bottle 100 of the present invention.

Notwithstanding the forgoing, the shaped bottle 100 and its components of the present invention can be of any suitable size and configuration as is known in the art without affecting the overall concept of the invention, provided that it accomplishes the above-stated objectives. One of ordinary skill in the art will appreciate that the size, configuration, and material of the bottle 100 as shown in the FIGS. are for illustrative purposes only, and that many other sizes and shapes of the bottle 100 are well within the scope of the present disclosure. Although the dimensions of the double head screw 100 are important design parameters for user convenience, the bottle 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A container device for holding consumable products comprising:
   a container having a geometric shape, a plurality of side walls, a top and a bottom;
   a first fastening member attached to at least one of the plurality of side walls;
   a second fastening member attached to the bottom; and
   a handle formed at a juncture of at least two of the plurality of side walls, wherein the top is comprised of a first opening and a second opening.

2. The container device as recited in claim 1, wherein the second opening is in fluid communication with a compartment.

3. The container device as recited in claim 2, wherein the second opening is a circular cap.

4. The container device as recited in claim 2, wherein the compartment holds at least one of a medication, a vitamin, a nutritional product, or a workout supplement.

5. The container device as recited in claim 1, wherein the first opening is in fluid communication with a fluid reservoir and is used for dispensing a fluid from the fluid reservoir.

6. The container device as recited in claim 5, wherein the first opening is triangular in shape and is disposed above the handle.

7. The container device as recited in claim 1, wherein the first and second fastening elements include one of a magnet, a hook and loop, an adhesive, a snap, a clasp or a combination thereof.

8. The container device as recited in claim 7, wherein the adhesive is a removable adhesive.

9. The container device as recited in claim 7, wherein the magnet is one of a permanent magnet or a metal alloy magnet.

10. The container device as recited in claim 7, wherein the magnet is a neodymium iron boron metal alloy magnet.

11. The container device as recited in claim 1, wherein only one of the first and second fastening members is used to hold the container to a surface.

12. The container device as recited in claim 11, wherein the container is triangular in shape.

13. A bottle device for holding a consumable component, the bottle device comprising:
   a triangular shaped bottle having a plurality of side surfaces, a top surface and a bottom surface, wherein at least one of the plurality of side surfaces form a rectangular panel;
   two of the plurality of side surfaces forming a handle;
   the bottom surface having a fastening member for removably securing the triangular shaped bottle to a surface in a first orientation; and
   the rectangular panel having a fastening member for removably securing the triangular shaped bottle in a second orientation that is different from the first orientation.

14. The bottle device as recited in claim 13, wherein the bottom surface fastening member and the rectangular panel fastening member include one of a magnet, a hook and loop, an adhesive, a snap, a clasp or a combination thereof.

15. The bottle device as recited in claim 14, wherein the magnetic fastening element is either a metal allow magnet or a ferrite permanent magnet.

16. The bottle device as recited in claim 15, wherein the magnetic fastening element is a neodymium iron boron metal alloy magnet.

17. The bottle device as recited in claim 13, wherein the top surface has a first opening and a second opening.

18. The bottle device as recited in claim 17, wherein the first opening is connected to a fluid reservoir and the second opening is connected to a compartment.

19. A bottle device comprising:
   a triangular shaped bottle having a first, second and third wall, a top surface and a bottom surface, two of the first, second and third walls forming a handle and one of the first, second and third walls having a rectangular panel having a magnetic element;
   the top surface having first and second openings, with the first opening connected to a fluid reservoir surrounded by the walls and the top and bottom surfaces;
   the bottom surface having a magnetic element; and
   the magnetic element on the rectangular panel holding the bottle in a first orientation and the magnetic element on the bottom surface holding the bottle in a second orientation different than the first orientation.

20. The bottle device as recited in claim 19, wherein each of the magnetic elements are a neodymium iron boron metal alloy magnet.

* * * * *